United States Patent
Fletcher et al.

[11] 3,790,906
[45] Feb. 5, 1974

[54] SYSTEM FOR STABILIZING CABLE PHASE DELAY UTILIZING A COAXIAL CABLE UNDER PRESSURE

[76] Inventors: James C. Fletcher, Administrator of the National Aeronautics and Space Administration, with respect to an invention of; Philip A. Clements, La Crescenta, Calif.

[22] Filed: Feb. 23, 1973

[21] Appl. No.: 335,201

[52] U.S. Cl.................. 333/16, 328/155, 333/18
[51] Int. Cl. ............................................ H04b 3/10
[58] Field of Search...... 333/16, 17, 18, 97 R, 98 P; 328/155; 174/11 R

[56] References Cited
UNITED STATES PATENTS
3,434,061   3/1969   Hahn et al. .................... 328/155

*Primary Examiner*—Paul L. Gensler
*Attorney, Agent, or Firm*—Monte F. Mott; John R. Manning; Paul F. McCaul

[57] ABSTRACT

A system for stabilizing the phase delay of signals passing through a pressurizable coaxial cable is disclosed. Signals from an appropriate source at a selected frequency, e.g., 100 MHz, are sent through the controlled cable from a first cable end to a second cable end which, electrically, is open or heavily mismatched at 100 MHz, thereby reflecting 100 MHz signals back to the first cable end. Thereat, the phase difference between the reflected-back signals and the signals from the source is detected by a phase detector. The output of the latter is used to control the flow of gas to or from the cable, thereby controlling the cable pressure, which in turn affects the cable phase delay. At the start of a period over which the cable phase delay is to be stabilized, the signals from the source which are supplied to the phase detector are phase shifted by a phase shifter until the detector's output is 0 volt, thereby inhibiting gas to flow either to or from the cable. Under these conditions, the cable phase delay represents an initial phase delay which is to be maintained constant over the period of interest. During the period any change in the cable phase delay from the initial phase delay results in an output of the phase detector which is other than 0 volt. The output is used to control gas to flow to or from the cable thereby vary the cable pressure until the output of the detector is again 0 volt, which indicates that the cable phase delay is again equal to the initial phase delay.

10 Claims, 3 Drawing Figures

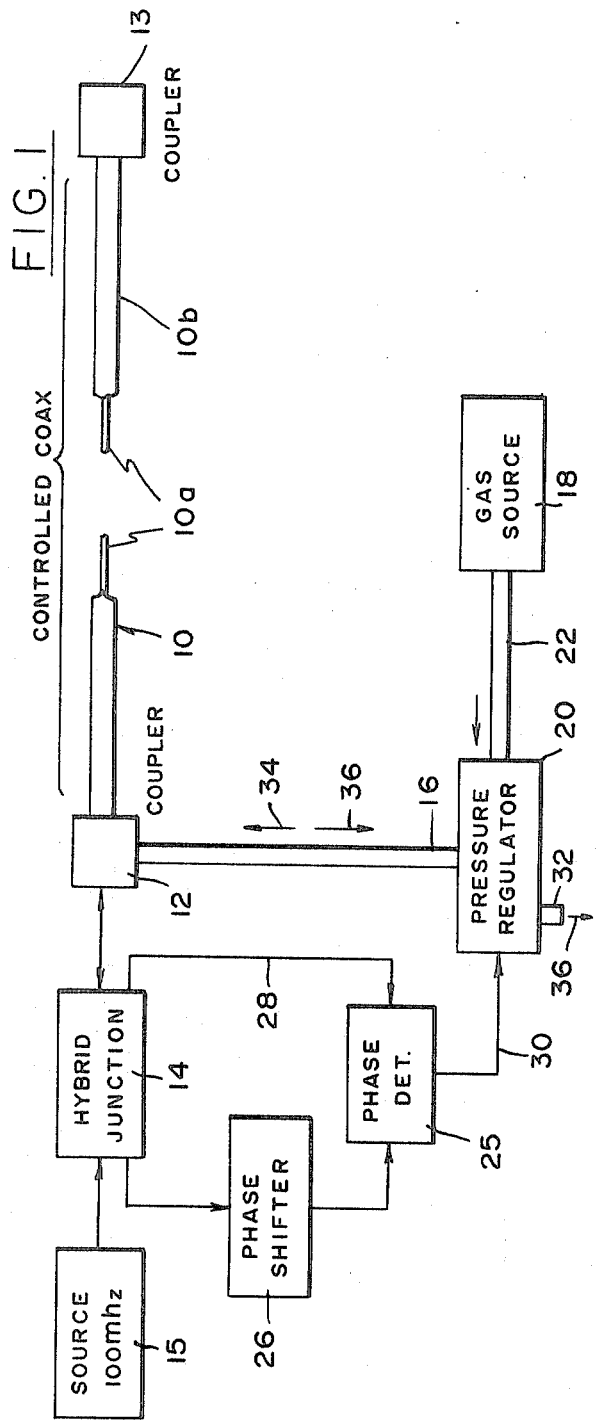
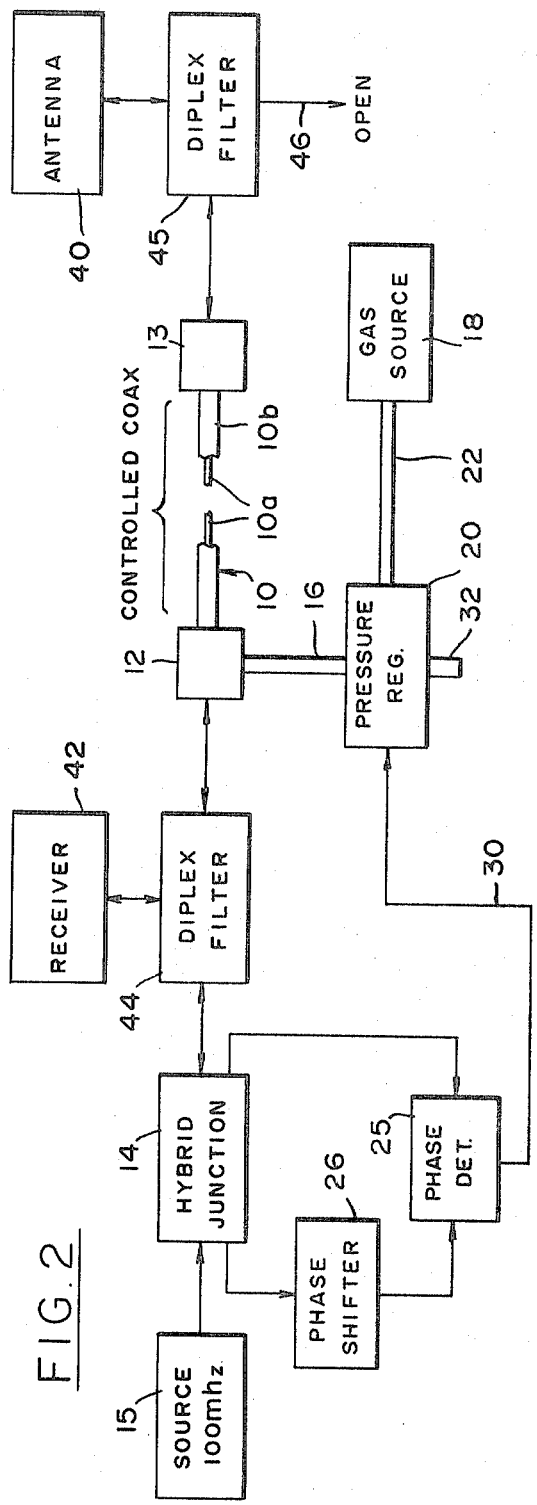

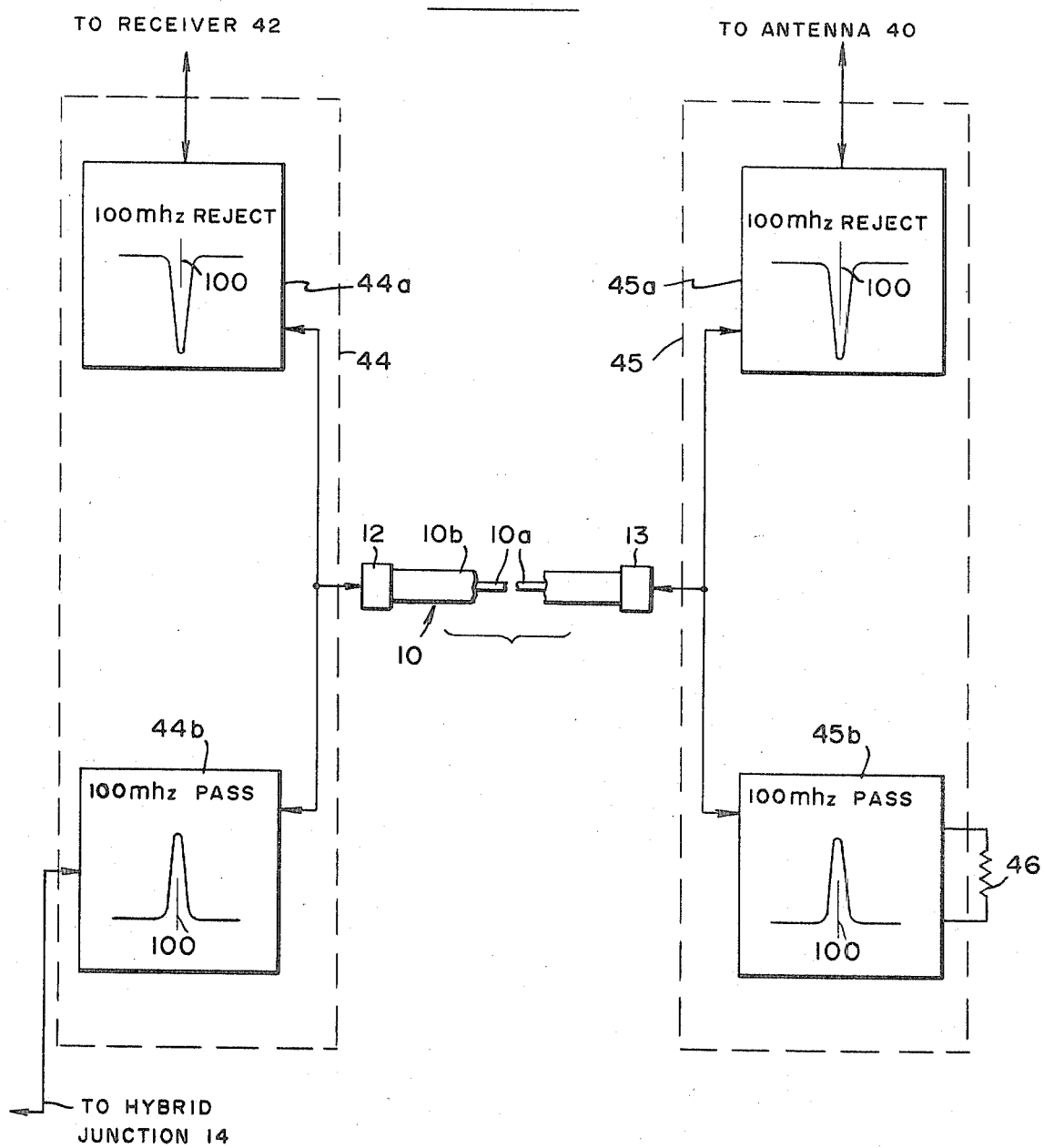

SYSTEM FOR STABILIZING CABLE PHASE DELAY UTILIZING A COAXIAL CABLE UNDER PRESSURE

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention generally relates to a phase delay control system and, more particularly, to a system for controlling the phase delay introduced by a coaxial cable to signals which are transmitted from a source to a load through the coaxial cable.

2. Description of the Prior Art

The use of a coaxial cable to connect a source of signals, such as an antenna, to a load, such as a receiver, is well known. One type of cable which is employed is of the air dielectric type. Such a cable is generally hollow with electrically insulating spacers supporting the inner conductor concentrically with the outer conductor. In some applications, such as in space-communication, in connection with which the invention will be described, the cable which connects a large tracking antenna to a receiver in a remotely located building, is quite long.

As is appreciated, such a cable introduces a phase delay in the signals which propagate therethrough from the tracking antenna to the receiver. The fact that the cable introduces a phase delay in the signals, which will be referred to hereafter as the cable phase delay or the cable group delay, is not important since at the time tracking is initiated, the cable phase delay can be measured and calibrated out when the initial conditions prior to the start of tracking are established. What is important for optimum tracking accuracy is for the cable phase delay to remain constant, i.e., equal to the phase delay at the time tracking is initiated, during the entire tracking period. Hereafter, the cable phase delay at the time tracking is initiated will be referred to as the initial phase delay.

Unfortunately, this is not the case. The cable phase delay is affected by changes in the environmental conditions, such as temperature or humidity, to which the cable is exposed. Consequently, during tracking any change in the cable phase delay from the initial phase delay, unless accounted for, is a potential source of error, which degrades the accuracy of the extracted information. Experience with such a system indicates that a significant improvement in performance can be achieved if the cable phase delay, can be maintained substantially constant and equal to the initial phase delay during the entire tracking period, irrespective of changes in environmental conditions.

OBJECTS AND SUMMARY OF THE INVENTION

It is a primary object of the present invention to provide a system for maintaining the cable group delay constant over a relatively long period, irrespective of changes in the cable's environment, during such period.

Another object of the present invention is to provide a system for controlling the phase delay introduced by a coaxial cable to signals propagating therethrough to be substantially constant over a relatively long period, despite changes in the cable's temperature or other environmental conditions, during the period.

A further object of the present invention, is to provide a novel method of maintaining the phase or group delay of a coaxial cable substantially constant under varying environmental conditions.

These and other objects of the invention are achieved based on the discovery that by controlling the internal pressure in a pressurizable coaxial cable, the phase shift or delay in the cable is controllable over a very broad band of frequencies. In accordance with the present invention, a system is provided which monitors the cable phase delay during the entire tracking period. During tracking whenever the phase delay differs from the initial phase delay, which existed at the start of tracking, the system varies the pressure in the cable thereby causing the cable phase delay to equal the initial phase delay. Thus, the cable phase delay is held constant during the entire tracking period.

The novel features of the invention are set forth with particularity in the appended claims. The invention will best be understood from the following description when read in conjunction with the accompanying drawings.

BRIEF DESCRIPTION OF THE DRAWINGS

FIG. 1 is a diagram useful in explaining the principles of the present invention;

FIG. 2 is a diagram of the present invention as used in the tracking system; and FIG. 3 is a diagram of diplex filters shown in FIG. 2.

DETAILED DESCRIPTION OF THE PREFERRED EMBODIMENTS

Attention is now directed to FIG. 1, which is a simplified diagram of an embodiment of the present invention. Therein, the tracking antenna, the receiver and their connections to the coaxial cable are purposely deleted to simplify the following description. In FIG. 1, numeral 10 designates a pressurizable coaxial cable, with a center conductor 10a. As is known, such a cable is pressurizable by controlling the pressure between the center conductor 10a and the outer conductor 10b. In the present embodiment, pressure control is achieved by controlling the flow of gas in and out of the cable 10. End couplers 12 and 13 are shown connected to the opposite ends of the cable 10.

Connected to coupler 12 through a hybrid junction 14 is a source of signals 15. For explanatory purposes, the frequency of the signals from source 15 is assumed to be 100 MHz. The coupler 12 is also shown connected to a gas line 16 which is connected to a source of gas 18 through a pressure regulator 20 and a gas line 22. Gas line 16 is in communication with the interior of cable 10 through coupler 12. Coupler 13 at the other end of cable 10 serves as a gas-tight end of the cable, while electrically it serves as an open end, or mismatched load, at the frequency of 100 MHz.

As will be explained hereafter, the function of regulator 20 is to control the flow of gas to or from the cable, thereby changing the pressure in the cable. The pressure change is used to control the cable phase delay to equal the initial phase delay during the entire tracking period. The gas may be any noncombustible gas, e.g., nitrogen, air or any other gas which will not create a hazardous condition.

In operation, signals at 100 MHz from source 15 are directed through junction 14 and coupler 12 into cable 10. 100 MHz signals from the source 15 are also directed through junction 14 to a phase detector 25 through a phase shifter 26. The 100 MHz signals which enter cable 10 travel to the opposite cable end which is terminated by coupler 13. Since the latter acts electrically as an open end, or mismatched load, signals at 100 MHz are reflected back and travel toward coupler 12. The reflected signals pass through coupler 12 to the hybrid junction 14 and therefrom to the phase detector 25, via line 28. The use of hybrid junctions for routing signals is well known. In one embodiment actually reduced to practice, a hybrid junction type H1 manufactured by Anzac Electronics, Inc., of Waltham, Mass., was employed.

As is appreciated, typically a phase detector produces a D.C. output signal which is a function of the phase difference between the two signals which are supplied thereto. In the present invention, the phase detector 25 produces an output signal which is dependent on the phase difference between the 100 MHz signals from source 15, which are coupled to it through phase shifter 26, and the 100 MHz signals which are reflected back through cable 10 and which are supplied to the phase detector 25 via line 28.

In accordance with the present invention, the output signal of phase detector 25 is supplied to regulator 20 via line 30. The regulator 20 is of the type which controls the flow of gas to or from the cable as a function of the output signal of the phase detector 25. When the output signal of the detector 25 is 0 volt, the regulator inhibits any gas from flowing either to or from the cable. Thus, the cable pressure does not change. However, when the output signal of the detector 25 is other than 0 volt, gas flows either to the cable, thereby increasing the cable pressure, or from the cable and is vented through vent 32, thereby decreasing the cable pressure.

The direction of gas flow to or from the cable depends on the polarity of the detector's output signal. For explanatory purposes, let it be assumed that when the output signal of detector 25 is positive, the regulator 20 controls the gas from source 18 to flow to the cable, as represented by arrow 34, thereby increasing gas pressure in the cable, while a negative output signal from detector 25 causes the regulator to control gas to flow from the cable 10 and be vented out through vent 32, as represented by arrows 36, resulting in a decrease in cable pressure. Such flow regulators are well known in the art.

In accordance with the present invention, as part of setting the system's initial conditions at the start of tracking, the output of the phase detector 25 is set to 0 volt. This is achieved by adjusting the setting of phase shifter 26, thereby controlling the phase shift of the signals from source 15 to equal the phase shift or delay of the signals which are reflected back from cable 10. With 0 volt output from detector 25, the regulator 20 inhibits any gas from flowing either to or from the cable. Thus, the cable is pressurized to an initial pressure. At this point in time, the cable phase delay is the initial phase delay which can be measured and calibrated out.

The function of the present invention, however, is not to measure the initial phase delay. Rather, it is to maintain the cable phase delay during the entire tracking period to equal the initial phase delay, regardless of its magnitude.

As tracking starts as long as the cable's phase delay does not vary from the initial phase delay, the output signal of the phase detector remains 0 volt. Therefore, no change in cable pressure takes place. If, however, due to changing environmental conditions or for any other reason, the cable's phase delay varies from the initial phase delay, the output signal of detector 25 is no longer 0 volt. Consequently, regulator 20 controls the flow of gas either into or out of the cable 10 to adjust the pressure therein until the output of the detector 25 is again 0 volt, which indicates that the cable's phase delay is again equal to the initial phase delay.

An increase in cable pressure results in an increase of cable phase delay, while a decrease in cable pressure results in a decrease in cable phase delay. In the present invention, the polarity of the output of the detector is negative when the cable phase delay, due to changes in the environmental conditions of the cable, increases above the initial phase delay. The negative output controls regulator 20 to cause gas to flow from the cable and be vented out thereby decreasing the pressure, which in turn decreases the cable phase delay. However, as long as the cable phase delay is greater than the initial phase delay, the polarity of the output of detector 25 is negative. Thus, more gas flows from the cable further reducing the pressure and thereby further reducing the cable phase delay, until it equals the initial phase delay. This occurs when the output of detector 25 is again 0 volt. Such an output, when supplied to regulator 20 stops the flow of gas from the cable. Thus, the cable is now pressurized to a pressure which is different from the initial pressure. However, the pressure is one which due to the effects of the environmental conditions on the cable results in a cable phase delay which is equal to the initial phase delay.

On the other hand, the polarity of the output of detector 25 is positive when the cable phase delay is less than the initial phase delay. The positive output controls the regulator 20 to cause gas to flow to the cable thereby increasing its pressure, which in turn increases the cable phase delay. Gas continues to flow to the cable until the cable phase delay equals the initial phase delay, which occurs when the output of detector 25 is again 0 volt. When this happens, the flow of gas stops. Thus, the cable is pressurized to a new pressure which produces a cable phase delay which equals the initial phase delay.

It should thus be apparent to those familiar with the art that the present invention acts as a closed-loop servo system. It regulates the cable's internal gas pressure to maintain the cable phase delay during the entire tracking period equal to the initial phase delay. By initially setting the output of detector 25 to 0 volt, thereby preventing gas flow to or from the cable, the latter is pressurized to the initial pressure, and the initial phase delay is established. Once the initial phase delay is established, any change of the cable phase delay therefrom is represented by a change in the output of detector 25 from 0 volt. When such change takes place, the system varies the cable pressure, by controlling the flow of gas to or from the cable, until the output of detector 25 is again 0 volt, which indicates that the cable phase delay is again equal to the initial phase delay.

Attention is now directed to FIG. 2, wherein the tracking antenna and receiver are designated by blocks 40 and 42, respectively. In practice, the hybrid junction is connected to the cable 10 through a diplex filter 44, to which the receiver 42 is also connected. Similarly, the antenna 40 is connected to the cable 10 through a diplex filter 45, which defines an open end or mismatched load to 100 MHz signals, as represented by arrow 46. The frequency of the signals from source 15 is chosen to be outside the band or bands of frequencies which are communicated from the antenna to the receiver. In the present example, it is assumed to be 100 MHz.

The functions of the diplex filters are to inhibit the 100 MHz signals from reaching either the antenna or the receiver, while at the same time preventing the signals from the antenna or receiver from interfering with the operation of the closed-loop servo system. The use of diplex filters is well known. For example, such a filter is commonly used with an antenna, used for transmit and receive, where the transmit and receive frequencies are different.

In the present example, each diplex filter may consist of a narrow band pass filter centered at 100 MHz to enable signals at 100 MHz to pass therethrough, and a narrow band reject filter centered at 100 MHz to enable all signals except those at 100 MHz to pass therethrough. Such diplex filters are shown in FIG. 3, wherein the reject and pass filters of diplex filter 44 are designated by blocks 44a and 44b, respectively. Similarly, the reject and pass filters of diplex filter 45 are designated by 45a and 45b, respectively. It should be pointed out that the function of filter 45b is to provide an open end or mismatched load at 100 MHz, as represented by resistor 46 which corresponds to arrow 46 in FIG. 2. This is necessary to insure that some of the signals at 100 MHz are reflected back through the cable and pass through filter 44b and the hybrid junction 14 to the phase detector 25.

Although hereinbefore the invention was described in connection with a cable 10 connecting the tracking antenna 40 to the receiver 42, the invention may be used in connection with a pressurizable coaxial cable used in any system to interconnect one unit which acts as source of signals and another unit which receives such signals. Also, although the invention has been described in connection with signals at 100 MHz, it should be apparent that signals at other frequencies may be used. In practice, the frequency of the signals is chosen to be outside the band or bands of frequencies of the signals in the system in which the present invention is incorporated. Furthermore, the invention may be incorporated in any system which uses a pressurizable coaxial cable whose phase delay is subject to change from an initial phase delay for reasons other than changes in environmental conditions.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A system comprising:
   a first source of signals of preselected frequencies;
   a pressurizable coaxial cable having first and second opposite ends;
   first receiver means;
   first and second means for connecting said first receiver and said first source means respectively to opposite ends of said cable whereby signals from said first source pass through said cable to said first receiver means;
   a second source of signals at a selected frequency other than any of the frequencies of the signals from said first source;
   third means including hybrid junction means coupled to said second source and to said first means for directing signals from said second source into said cable;
   fourth means coupled to said second means and responsive to signals from said second source carried by said cable from said first means for reflecting back said signals to said hybrid junction means through said first means;
   fifth means including a phase detector coupled to said hybrid junction for providing an output signal as a function of the phase difference between signals from said second source and the signals reflected back by said fourth means; and
   pressure control means coupled to said cable and to said phase detector for controlling the pressure in said cable as a function of the output signal of said phase detector.

2. The system as described in claim 1 wherein said first means includes a first diplex filter for inhibiting signals at said selected frequency from reaching said first receiver means, and for inhibiting signals at other than said selected frequency from reaching said hybrid junction means, and wherein sadi second means includes a second diplex filter for inhibiting signals at said selected frequency from reaching said first source and for inhibiting signals at other than said selected frequency from reaching said fourth means.

3. The system as described in claim 2 wherein said pressure control means include a source of gas and gas flow regulating means for controlling the pressure in said cable by regulating the flow of gas to and from said cable.

4. The system as described in claim 3 wherein the output signal of said phase detector is a D.C signal applied to said gas flow regulating means, and wherein said gas flow regulating means inhibits the flow of gas to or from said cable when the amplitude of the D.C. output signal of said phase detector is zero, controls gas to flow to said cable when the D.C. output signal of said phase detector is of a first polarity, and further controls gas to flow out of said cable when the D.C. output signal of said phase detector is of a second polarity opposite said first polarity.

5. The system as described in claim 4 wherein said fifth means includes a phase shifter coupled between said hybrid junction means and said phase detector for selectively shifting the phase of the signals from said second source supplied to said phase detector through said hybrid junction means.

6. An arrangement comprising:
   a source of signals at a selected frequency;
   a pressurizable coaxial cable having first and second ends;
   first means coupled to said source and to the cable first end for applying signals from said source to said cable, said signals propagating to the cable second end;

second means coupled to said cable at said second end for reflecting the signals from said source back toward said first end, said first means including hybrid junction means coupled between said source and said cable first end for directing the signals from said source to said cable first end and to a first output port thereof and for directing the signals reflected back by said second means to a second output port of said hybrid junction means;

phase shift means coupled to said first port of said hybrid junction means for selectively shifting the phase of the signals from said source present at said first port;

phase detector means coupled to the phase shift means and to said second port for providing an output signal as a function of the phase difference between the output signals from said phase shift means which represent the signals from said source phase shifted by said phase shift means and the signals reflected back to said first end by said second means; and pressure control means coupled to said first cable end and to said phase detector means for controlling the pressure in said cable as a function of the output signal of said phase detector means.

7. The arrangement as described in claim 6 wherein said pressure control means include a source of gas and gas flow regulating means for controlling the pressure in said cable by regulating the flow of gas to and from said cable.

8. The arrangement as described in claim 7 wherein the output signal of said phase detector means is a D.C. signal applied to said gas flow regulating means, and wherein said gas flow regulating means inhibits the flow of gas to or from said cable when the amplitude of the D.C. output signal of said phase detector means is zero, controls gas to flow to said cable when the D.C. output signal of said phase detector means is of a first polarity, thereby increasing cable pressure, and further controls gas to flow out of said cable when the D.C. output signal of said phase detector means is of a second polarity opposite said first polarity, thereby reducing cable pressure.

9. An arrangement for maintaining during a selected time period, the phase delay of a pressurizable coaxial cable having first and second ends substantially constant and equal to an initial phase delay which is the cable phase delay at the start of said period, comprising:

a source of signals at a selected frequency;

a pressurizable coaxial cable having first and second ends;

first means coupled to said source and to said cable first end for applying the signals at said selected frequency to said cable;

second means coupled to the cable second end for reflecting signals at said selected frequency back to said cable first end to which said first means is coupled, said first means including phase detector means to which signals from said source and the signals reflected back from said second means are applied for providing an output signal which is a function of the phase difference between the signals applied thereto; and pressure control means coupled to said cable and responsive to the output signal of said phase detector means for controlling the pressure in said cable as a function of the output signal of said phase detector means, said first means further including phase shift means for selectively shifting the phase of the signals from said source which are supplied to said phase detector means at the start of said period so that the output signal of said phase shifting means controls said pressure control means to inhibit the cable pressure from changing.

10. An arrangement as described in claim 9 wherein said phase shift means is manually controllable at the start of said period to selectively shift the phase of the signals from said source to the phase detector means so that the output signal of the latter is of substantially zero amplitude, and said pressure control means include a source of gas and gas flow regulatng means responsive to the output signal of said phase detector means for inhibiting gas to flow either to or from said cable when the amplitude of the output signal of said phase detector means is zero, said gas flow regulating means controlling gas to flow either to or from said cable as a function of the polarity of the output signal of said phase detector means.

* * * * *